US011144257B1

(12) United States Patent
Oyama et al.

(10) Patent No.: US 11,144,257 B1
(45) Date of Patent: Oct. 12, 2021

(54) COMPONENT MANAGEMENT DEVICE, COMPONENT MANAGEMENT METHOD, AND NON-TRANSITORY STORAGE MEDIUM

(71) Applicant: TOSHIBA TEC KABUSHIKI KAISHA, Tokyo (JP)

(72) Inventors: Satoshi Oyama, Mishima Shizuoka (JP); Hiroyo Tanaka, Tokyo (JP); Kazuhiro Ogura, Hiratsuka Kanagawa (JP); Sou Miyazaki, Sunto Shizuoka (JP); Masaki Narahashi, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/824,849

(22) Filed: Mar. 20, 2020

(51) Int. Cl.
*G06F 11/30* (2006.01)
*G06F 3/12* (2006.01)

(52) U.S. Cl.
CPC ............ *G06F 3/121* (2013.01); *G06F 3/1229* (2013.01)

(58) Field of Classification Search
CPC ............................... G06F 3/121; G06F 3/1229
USPC ............ 358/1.14, 1.15; 399/10, 12, 30, 110
See application file for complete search history.

(56) References Cited

U.S. PATENT DOCUMENTS

| 2008/0062211 A1* | 3/2008 | Kamisuwa | G03G 15/5079 347/5 |
| 2008/0181625 A1* | 7/2008 | Moodie | G03G 15/5079 399/24 |

FOREIGN PATENT DOCUMENTS

| JP | 2010-139768 | 6/2010 |
| JP | 2011-150565 | 8/2011 |
| JP | 2015-216607 | 12/2015 |

* cited by examiner

*Primary Examiner* — Jamares Q Washington
(74) *Attorney, Agent, or Firm* — Amin, Turocy & Watson, LLP

(57) ABSTRACT

According to one embodiment, provided is a component management device includes a detection unit, a correlation determination unit, and an update unit. The detection unit detects a first-class component whose used amount exceeds the threshold value and which is used without causing a failure, and detects a first-class device that is a device including the detected first-class component and not causing a failure related to the first-class component. The correlation determination unit determines the presence or absence of a correlation with respect to a first correlation that is a correlation between the used amount of the detected first-class component and an operating condition of the first-class device. When it is determined that there is no correlation for the first correlation, the update unit determines a first update value that is an update value of the threshold value based on the used amount of the first-class component in the first-class device.

17 Claims, 4 Drawing Sheets

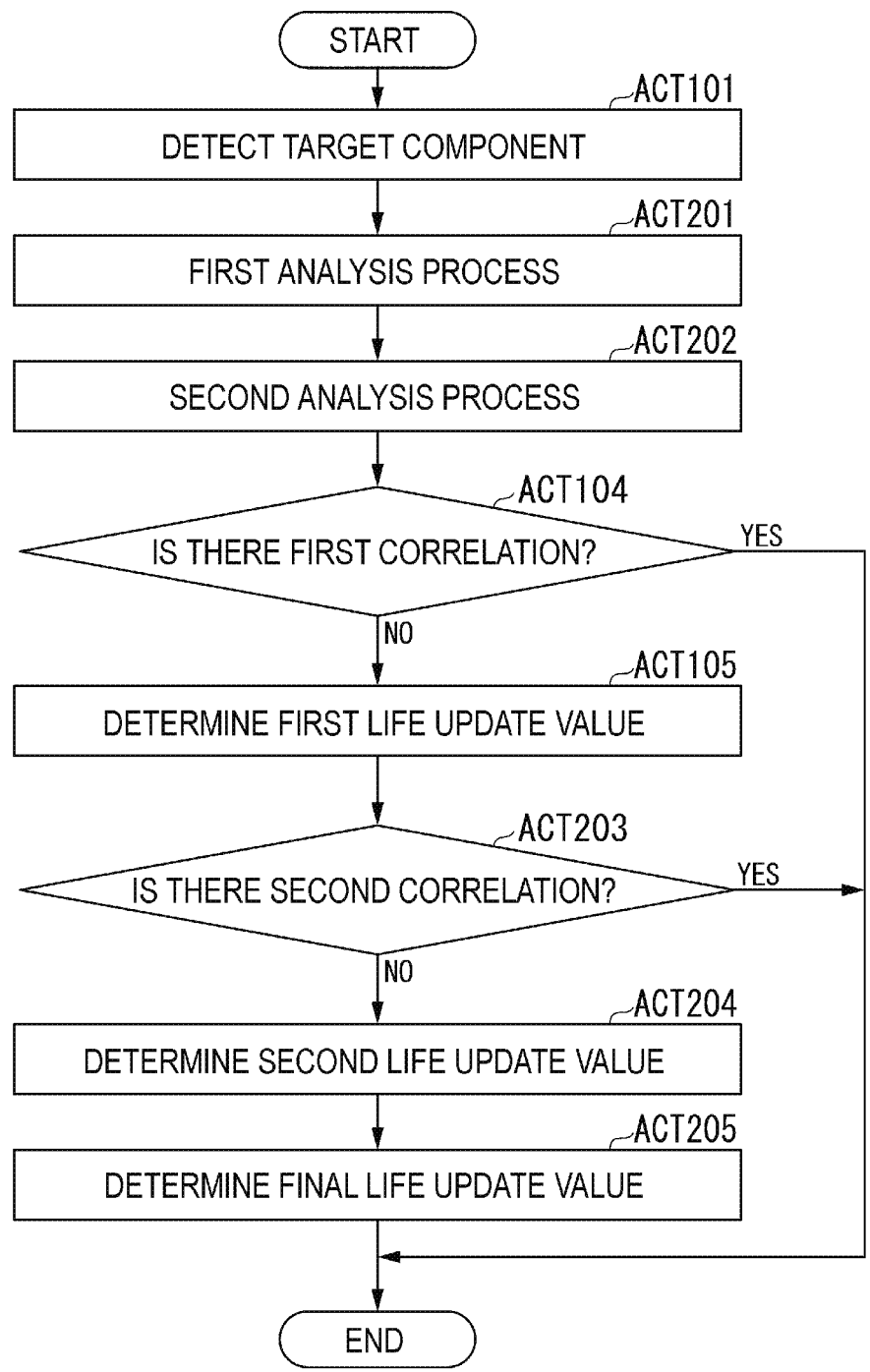

COMPONENT MANAGEMENT DEVICE, COMPONENT MANAGEMENT METHOD, AND NON-TRANSITORY STORAGE MEDIUM

FIELD

Embodiments described herein relate generally to a component management device, a component management method, and a non-transitory storage medium.

BACKGROUND

In the related art, a multifunction peripheral (MFP) is generally configured to extend the life of the apparatus by replacing components. For example, the MFP records an index value indicating the degree of consumption for each replaceable component, and a component whose index value exceeds a predetermined threshold value is determined as a replacement target. This threshold value is an index value that serves as a guide for replacement, and a recommended value for each component is set in the MFP in advance. Hereinafter, this threshold value is referred to as "replacement-recommended life".

In general, a certain degree of accuracy variation, manufacturing error, and the like may occur between components of the same type. Further, even for components of the same type, the degree of consumption varies depending on the type of MFP used and the manner of use by the user. In addition, the time until the components required to be replaced are actually replaced also differs depending on the operation method of the user. The appropriate value of the replacement-recommended life may fluctuate due to such various factors. Therefore, for safety, the value of the replacement-recommended life is often set with a certain margin so that the component is replaced before the end of the life. In addition, the value of the replacement-recommended life is often rounded down to a value that is good for rounding. As described above, when the margins due to various circumstances are accumulated, the replacement-recommended life may greatly deviate from the actual life. As a result, components that can still be used will be replaced more quickly than necessary, and the operation cost may increase more than necessary.

DESCRIPTION OF THE DRAWINGS

FIG. 7 is a flowchart illustrating a specific example of a life update process executed by the component management device.

DETAILED DESCRIPTION

In order to suppress an increase in operation costs, a technique capable of setting the replacement-recommended life to a more appropriate value is provided. In general, according to one embodiment, there is provided a component management device that manages a threshold value related to a used amount of replaceable components. The component management device includes a detection unit, a correlation determination unit, and an update unit. The detection unit detects a first-class component whose used amount exceeds the threshold value and which is used without causing a failure, based on component information related to the used amount and failure information related to the failure occurred with respect to the component in the device including the component, and detects a first-class device that is a device including the detected first-class component and not causing a failure related to the first-class component. The correlation determination unit determines the presence or absence of a correlation with respect to a first correlation that is a correlation between the used amount of the detected first-class component and an operating condition of the first-class device. When it is determined that there is no correlation for the first correlation, the update unit determines a first update value that is an update value of the threshold value based on the used amount of the first-class component in the first-class device.

Hereinafter, a component management device, a component management method, and a non-transitory storage medium according to an embodiment will be described with reference to the drawings.

First Embodiment

Figure 1:
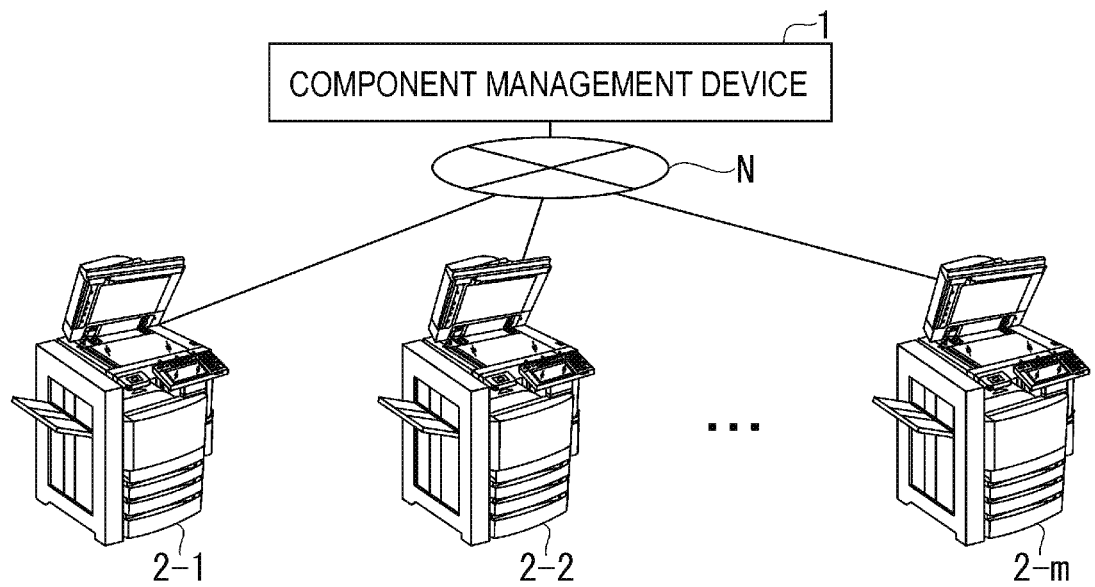
FIG. 1 is a diagram illustrating a configuration example of a component management device according to a first embodiment.

FIG. 1 is a diagram illustrating a configuration example of a component management device according to a first embodiment. A component management device 1 is a device that manages the replacement-recommended life of replaceable components included in a plurality of multifunction peripherals 2. The component management device 1 can communicate with the plurality of multifunction peripherals 2 (MFPs) via a network N. FIG. 1 illustrates multifunction peripherals 2-1 to 2-$m$ ($m$ is an integer of 2 or more) as the plurality of multifunction peripherals 2. The network N may be a local area network (LAN) or a wide area network (WAN) including a wide area network such as the Internet.

Here, the replacement-recommended life (hereinafter, referred to as "life") is a value determined as a guide for component replacement, and is a threshold value determined with respect to the used amount of the component. Generally, the life is a value determined for each component, and is set in advance in each multifunction peripheral 2. In general, the multifunction peripheral 2 has a function of recording the used amount of each component and notifying the user that a component whose used amount has exceeded the life needs to be replaced.

The used amount of the component in the present embodiment is a value indicating the degree of consumption of the component, and is represented based on various index values correlated with the degree of consumption of the component. For example, the used amount of the component may be represented by the used time of the component, or may be represented by the number of uses. For example, the used amount of components in the multifunction peripheral may be represented by the number of executions of a printing process or a copying process, or may be represented by the number of times that a recording medium is passed.

Further, the used amount of components in the multifunction peripheral may be represented by the number of rotations of the conveyance roller, or may be represented by the number of executions of a reading process. The used amount of components may be represented using an index value that differs for each type of component. Further, the used amount of one type of component may be obtained based on a plurality of index values.

Further, the multifunction peripheral 2 according to the embodiment has a function of transmitting operation information of the own device to the component management device 1. The operation information is information related to the operation of the multifunction peripheral 2, and is information including at least component information and failure information. The component information is information indicating the used amount of each replaceable component of the multifunction peripheral 2. Alternatively, the component information may be information indicating various index values used to obtain the used amount of each component. Further, the failure information is information related to a failure occurred in the multifunction peripheral 2 and includes information related to a failure occurred due to the consumption of components. For example, the multifunction peripheral 2 may transmit the system log of the own device to the component management device 1 as operation information. In this case, in the component management device 1, it is preferable to perform a pre-process of removing unnecessary information other than the component information and the failure information included in the system log, the error log, and the like.

On the other hand, the component management device 1 according to the embodiment has a function of updating the life set in each multifunction peripheral 2 to a more appropriate value based on the component information and the failure information acquired from the plurality of multifunction peripherals 2. With this life update function, the component management device 1 can optimize the life for each component with respect to each replaceable component of each multifunction peripheral 2. As a result, the life of the component is extended, and an increase in operation cost can be suppressed. Hereinafter, the configurations of the component management device 1 and the multifunction peripheral 2 according to the embodiment having such effects will be described in detail.

Figure 2:
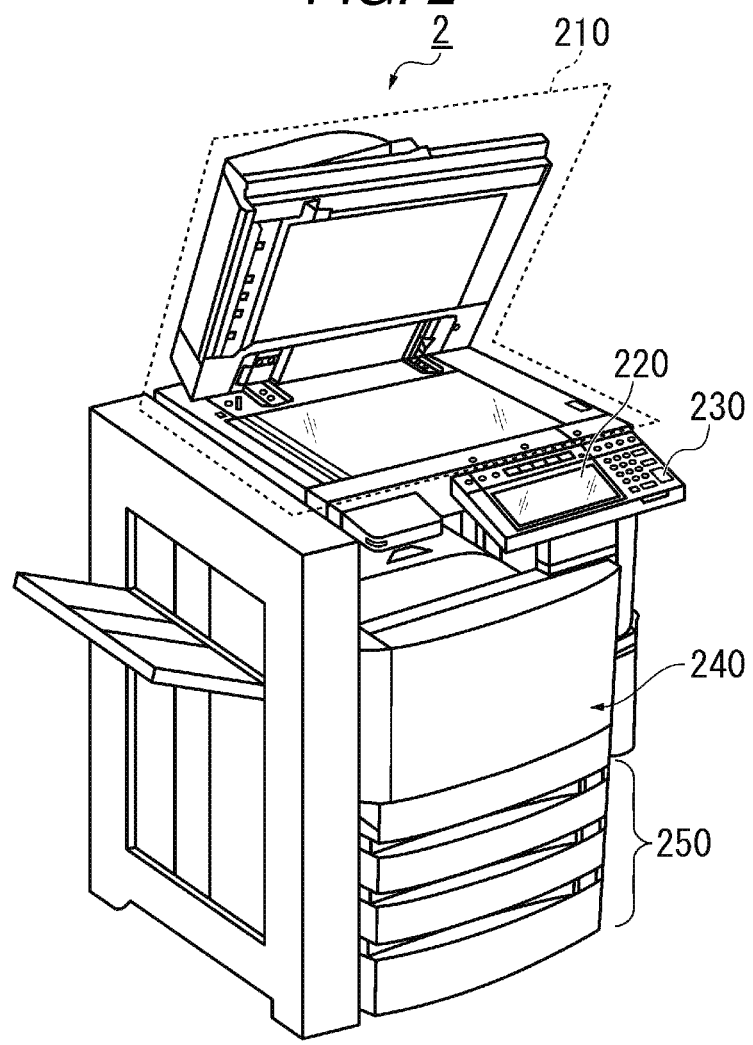
FIG. 2 is an external view illustrating a configuration example of a multifunction peripheral according to the first embodiment.
Figure 3:
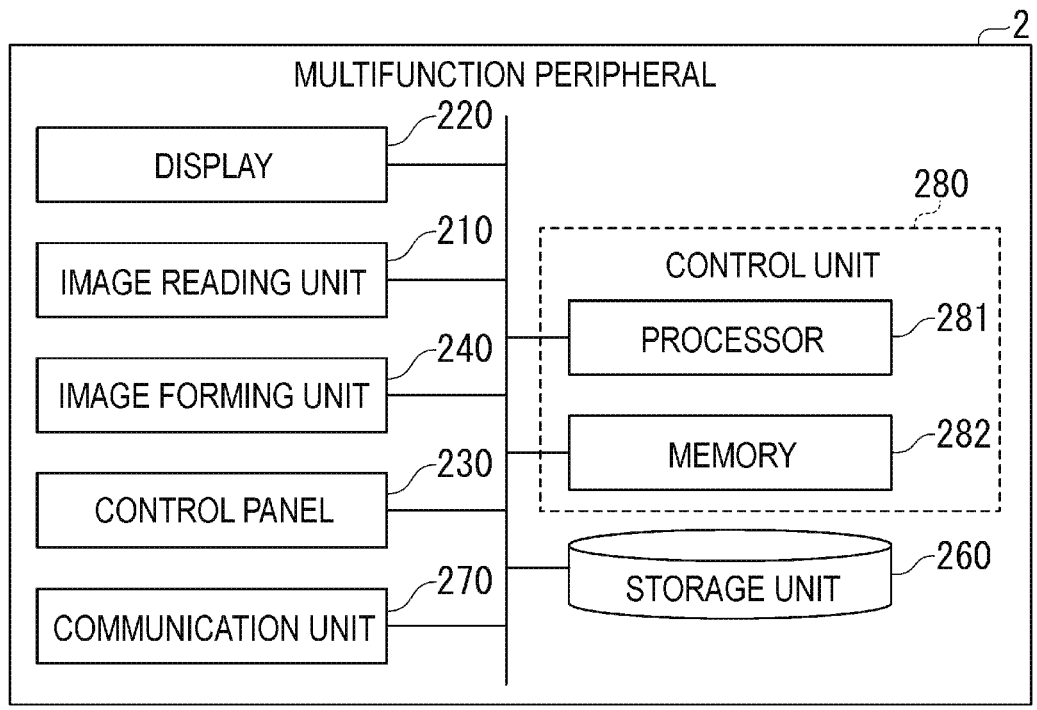
FIG. 3 is a diagram illustrating an example of a hardware configuration of the multifunction peripheral.

FIG. 2 is an external view illustrating a configuration example of the multifunction peripheral 2 according to the first embodiment. Also, FIG. 3 is a diagram illustrating an example of a hardware configuration of the multifunction peripheral 2 according to the first embodiment. The multifunction peripheral 2 includes an image reading unit 210, a display 220, a control panel 230, an image forming unit 240, a sheet accommodation unit 250, a storage unit 260, a communication unit 270, and a control unit 280.

The multifunction peripheral 2 forms an image on a sheet with a developer such as a toner or ink. When the developer is a toner, the developer is fixed on the sheet by heating. When the developer is ink, an image is formed on the sheet by dropping the developer on the sheet. The sheet is, for example, paper or label paper. The sheet may be any sheet as long as the multifunction peripheral 2 can form an image on the surface thereof. The toner may be a decolorable toner that decolors at a predetermined temperature.

The image reading unit 210 is, for example, a scanner. The image reading unit 210 reads image information to be read as the brightness of the light. The image reading unit 210 records the read image information. The recorded image information may be stored in the storage unit 260 of the multifunction peripheral 2, or may be transmitted to another information processing device via a network. The recorded image information may be formed as an image on a sheet by the image forming unit 240.

The display 220 is an image display device such as a liquid crystal display and an organic EL (Electro Luminescence) display. The display 220 displays various pieces of information related to the multifunction peripheral 2.

The control panel 230 has a plurality of buttons. The control panel 230 receives a user operation. The control panel 230 outputs a signal corresponding to an operation performed by the user to a control unit (the control unit 280 described later) of the multifunction peripheral 2. The display 220 and the control panel 230 may be configured as an integrated touch panel.

The image forming unit 240 forms an image on a sheet based on the image information generated by the image reading unit 210 or the received image information. The image forming unit 240 includes, for example, a developing device, a transfer device, and a fixing device. A sheet conveyance path is formed in the image forming unit 240. The sheet to be processed is conveyed by rollers provided in the conveyance path. An image is formed on the sheet in the course of conveyance.

The image forming unit 240 forms an image by, for example, the following processing. The developing device of the image forming unit 240 forms an electrostatic latent image on a photosensitive drum based on the image information. The developing device of the image forming unit 240 forms a visible image by attaching a developer to the electrostatic latent image.

The transfer device of the image forming unit 240 transfers the visible image onto the sheet. The fixing device of the image forming unit 240 fixes the visible image on the sheet by heating and pressurizing the sheet. The sheet on which an image is formed may be a sheet accommodated in the sheet accommodation unit 250 or a manually inserted sheet. The sheet accommodation unit 250 accommodates sheets to be used for image formation in the image forming unit 240.

The storage unit 260 is configured using a storage device such as a magnetic hard disk device or a semiconductor storage device. The storage unit 260 stores data required when the multifunction peripheral 2 operates. The storage unit 260 may store temporarily or save image data formed in the multifunction peripheral 2.

The communication unit 270 is configured using a communication interface. The communication unit 270 communicates with another device (for example, an information terminal such as a personal computer) via a network such as a LAN. For example, the communication unit 270 communicates information such as print data or scanner data with a user terminal. The print data includes image data to be subjected to image formation, and the scanner data is image data read by the image reading unit 210.

The communication unit 270 communicates with the component management device 1 via the network N. For example, the communication unit 270 transmits the component information and the failure information to the component management device 1. Further, for example, the communication unit 270 receives information indicating the value of the life to be set from the component management device 1.

The control unit 280 (controller) is configured using a processor 281 such as a central processing unit (CPU) and a memory 282. The control unit 280 reads a program stored in advance in the storage unit 260 into the memory and executes the program. The control unit 280 controls the operation of each device provided in the multifunction peripheral 2. For example, when receiving an instruction to form an image from a user terminal, the control unit 280 may control the own device so as to form an image on a sheet according to the received instruction. For example, upon receiving an image reading instruction from a user terminal, the control unit 280 may control the own device to transmit the data of the image read by the image reading unit 210 to the user terminal that is the transmission source of the instruction.

In addition, the control unit 280 records, for example, in the storage unit 260, component information indicating the used amount of each replaceable component of the own device. The control unit 280 updates the component information in accordance with the operation of the own device, and transmits the component information to the component management device 1 at a predetermined timing. If the control unit 280 detects that a failure due to the consumption of a component has occurred in the own device, the control unit 280 records failure information related to the failure in the storage unit 260. The control unit 280 performs component management of the failure information at a predetermined timing. The control unit 280 may transmit the component information and the failure information in response to a request from the component management device 1.

Further, when the control unit 280 is instructed by the component management device 1 to update the life, the control unit 280 updates the current life value with the new life value specified by the component management device 1. For example, the life setting information is stored in the storage unit 260. The control unit 280 monitors the replacement timing of each replaceable component of the own device based on the setting information.

Figure 4:
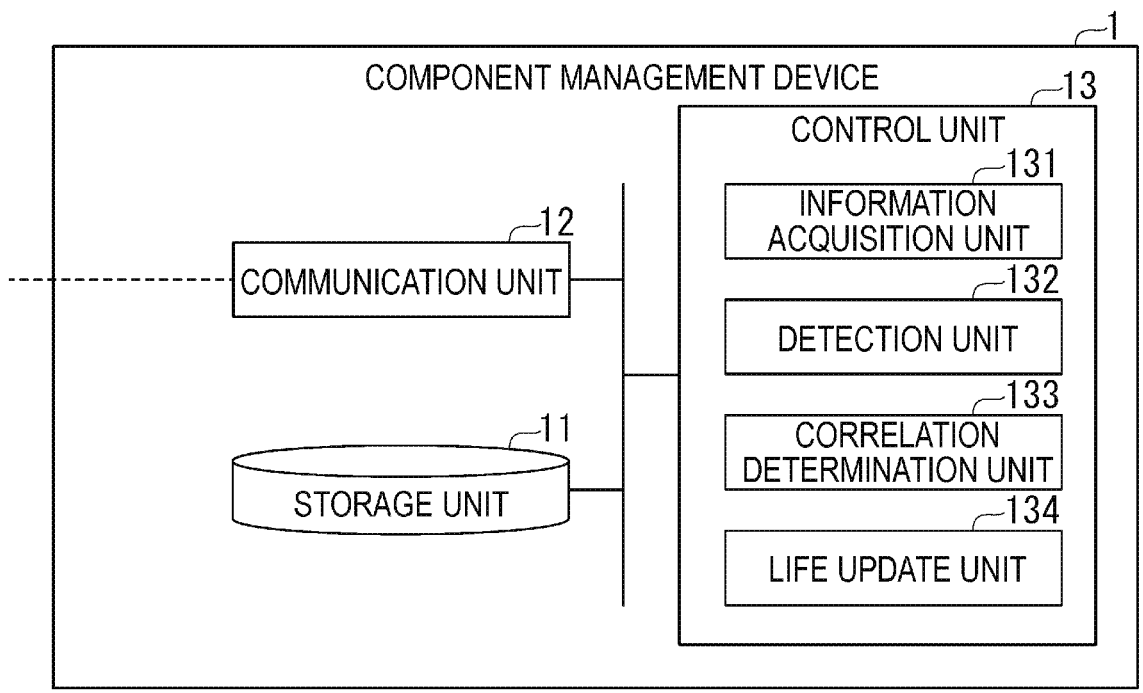
FIG. 4 is a diagram illustrating an example of a functional configuration of the component management device.

FIG. 4 is a diagram illustrating an example of a functional configuration of the component management device 1 according to the first embodiment. The component management device 1 includes a processor, a memory, an auxiliary storage device, and the like connected by a bus, and executes a program. The component management device 1 functions as a device including the storage unit 11, the communication unit 12, and the control unit 13 by executing a program. Here, for simplicity, the component management device 1 is illustrated as one device, but the component management device 1 may be configured by distributing individual components to a plurality of devices.

The storage unit 11 is configured using a storage device such as a magnetic hard disk device or a semiconductor storage device, and functions as the above-described auxiliary storage device. The storage unit 11 stores various pieces of information used or generated by the component management device 1 in the operation thereof, in addition to the operation information acquired from each multifunction peripheral 2.

The communication unit 12 is a communication interface that connects the component management device 1 to the network N. The communication unit 12 communicates with each multifunction peripheral 2 via the network N. The communication unit 12 transmits information output from the control unit 13 to each multifunction peripheral 2 and outputs the information received from each multifunction peripheral 2 to the control unit 13.

The control unit 13 is a functional unit that functions when a processor and a memory execute a program stored in the storage unit 11. Specifically, the control unit 13 functions as a functional unit including an information acquisition unit 131, a detection unit 132, a correlation determination unit 133, and a life update unit 134 by executing the above-described program.

The information acquisition unit 131 has a function of acquiring operation information from each multifunction peripheral 2. For example, the information acquisition unit 131 acquires operation information from each multifunction peripheral 2 via the communication unit 12. The information acquisition unit 131 records the acquired operation information in the storage unit 11.

The detection unit 132 has a function of detecting the type of a component whose life is to be updated (hereinafter, referred to as "target component") based on the operation information of each multifunction peripheral 2. Further, the detection unit 132 has a function of detecting the first-class device for each target component. Here, the first-class device is the multifunction peripheral 2 including components used beyond a predetermined life and without causing a failure.

The correlation determining unit 133 has a function of determining, for each target component, whether there is a correlation between the operating condition of the first-class device and the used amount of the target component included in the first-class device. Hereinafter, this correlation is referred to as a first correlation.

The life update unit 134 has a function of updating the life set for each target component based on the presence or absence of the first correlation determined by the correlation determination unit 133. Specifically, the life update unit 134 calculates an update value of the life when it is determined that there is no correlation for the first correlation, and does not calculate an update value of the life when it is determined that there is a correlation for the first correlation. The life update unit 134 may display the determined life update value on a display unit (not shown) or the like, or may notify another device via the communication unit 12.

With such a configuration, the component management device 1 according to the embodiment can update the life of the target component to an appropriate value according to the usage status of the multifunction peripheral 2. As described above, the life of a replaceable component is generally set to a value including a certain margin. Therefore, with the component management device 1 according to the embodiment, the user can change an unnecessarily long life to an appropriate value according to the usage status of the component.

Here, the margin included in the life is determined for the purpose of proper and safe operation of the multifunction peripheral 2. Since changing the life of a component increases the operational risk considerably, the life should be changed carefully. However, in order to determine whether or not the life can be changed, it is necessary to analyze the state of the multifunction peripheral 2, the degree of consumption of the components, and the like, which is troublesome.

Furthermore, if the life is individually changed for each target multifunction peripheral 2, the management becomes complicated and the operation cost may increase. On the other hand, the component management device 1 according to the embodiment has a support function that enables a change in life to be performed safely and easily. Hereinafter, a configuration for realizing such a support function will be described in detail.

Figure 5:
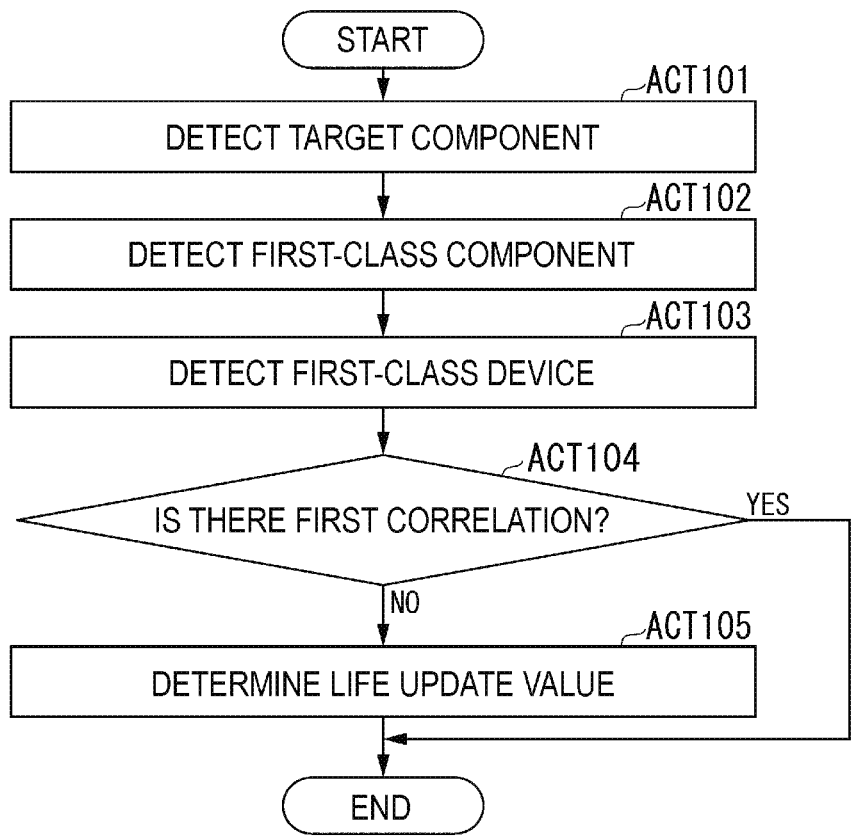
FIG. 5 is a flowchart illustrating a specific example of a life update process executed by the component management device.

FIG. 5 is a flowchart illustrating a specific example of a life update process executed by the component management device 1 according to the first embodiment. The life update process is a process of determining whether or not the current life of a replaceable component of the multifunction peripheral 2 can be changed, and updating the life as necessary. First, in the component management device 1, the detection unit 132 detects a target component based on the operation information acquired from the plurality of multifunction peripherals 2 (ACT101). Here, for simplicity, a case where a certain target component is detected will be described. However, in reality, a plurality of types of components can be detected as target components. When a plurality of target components are detected, the following processes may be performed for each target component.

Specifically, the detection unit 132 detects the target component based on the component information and the failure information included in the operation information. For example, the component information includes identification information and a used amount of each component, and identification information (for example, a serial number or the like) of the multifunction peripheral 2 including each component. The detection unit 132 can acquire the used amount of each component included in each multifunction peripheral 2 based on the component information. Further, the failure information includes information related to the occurred failure. Further, the component information and the failure information include time information when each piece of information is acquired. Based on the time information, the detection unit 132 can associate a failure that occurred in each multifunction peripheral 2 with a component related to the failure. The operation information including such component information and failure information is continuously acquired from each multifunction peripheral 2 at a predetermined timing, and is accumulated in the storage unit 11. Based on the component information and the failure information thus accumulated, the detection unit 132 detects a component that satisfies the following conditions A1 and A2 as a target component.

[Condition A1] No failure related to itself has occurred in a past predetermined period (hereinafter referred to as a "detection period").

In this case, components that have a replacement record and have no failure before and after the replacement also become detection targets. Here, it is assumed that information relating to component replacement is included in the operation information, and the detection unit 132 can identify the presence or absence of a replacement record based on the operation information.

[Condition A2] Among various components satisfying the condition A1, components in which those which are used beyond the life account for a certain ratio or more of the total. Hereinafter, this certain ratio is referred to as a first threshold value.

Subsequently, the detection unit 132 detects the first-class component for the detected target component (ACT102). Here, the first-class component is a component used beyond the replacement life among components corresponding to the target component. That is, the target component can be said to be a component in which the ratio of the first-class component in the entire components is equal to or greater than the first threshold value.

Subsequently, the detection unit 132 detects the first-class device based on the detected first-class component (ACT103). Here, the first-class device is a device including the first-class component. That is, the first-class device is a device including a component used beyond the life among components corresponding to the target component.

In general, the used amount of a component is proportional to the length of the detection period, and as the used amount of a component is larger, the possibility of occurrence of a failure becomes higher. Therefore, as the detection period is longer, the possibility that the condition A1 is satisfied becomes lower. On the other hand, as described later, the used amount of the target component (the first-class component) in the first-class device is used when determining the update value of the life of the target component. Therefore, as the first threshold value is larger, the life update value can be determined based on more operation records, but the possibility that the condition A2 is satisfied becomes lower. On the other hand, as the first threshold value is smaller, the possibility that the condition A2 is satisfied increases, but the life update value is determined based on smaller records. As described above, the length of the detection period and the value of the first threshold value affect the update frequency and the safety of the life, and thus may be appropriately adjusted according to the assumed update frequency and the allowable safety. For example, when updating the life of the multifunction peripheral 2, it is conceivable that the first threshold value is set to about 20% for a detection period of about three months.

Subsequently, the correlation determination unit 133 determines whether there is a correlation (first correlation) between the used amount of the detected first-class component and the operating condition of the first-class device (ACT104). Here, the operating condition is a condition under which the detected first-class component is used (or operates) in the first-class device. For example, as an example of the operating conditions, there are the temperature and the humidity of an environment in which the first-class device operates. Here, it is assumed that information related to the operating conditions (hereinafter referred to as "operating condition information") has been acquired in advance as a part of the operation information. The operating condition information may be acquired separately from the operation information. In this case, the operating condition information may be acquired only from the first-class device detected by ACT102.

For example, the correlation determination unit 133 determines the presence or absence of a correlation based on a correlation coefficient r calculated by the following equation (1).

$$r = \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2}\sqrt{\frac{1}{n}\sum_{i=1}^{n}(y_i - \bar{y})^2}} \quad (1)$$

For example, when the operating condition is temperature, the used amount of the first-class component in the detection period as x and the temperature as y are applied to the equation (1). In the equation (1), $\bar{x}$ (the meaning of a symbol with - immediately above x) represents the average of x, and $\bar{y}$ (the meaning of the symbol with - immediately above y) represents the average of y. Also, i (an integer of 1 or more) represents the identification number of the first-class device. The correlation determination unit 133 calculates the correlation coefficient r by applying the operating condition information of all the multifunction peripherals 2 detected as the first-class device to the equation (1). The correlation determination unit 133 determines that there is a correlation when the calculated correlation coefficient r is equal to or greater than a predetermined threshold value, and determines that there is no correlation when the calculated correlation coefficient r is less than the threshold value.

In order to more reliably determine whether or not there is a correlation, the correlation determination unit 133 may determine whether or not there is a correlation, based on correlation coefficients calculated for a plurality of different periods. For example, when the detection period is about three months, the detection period is divided into three periods every month, and a correlation coefficient is calculated for each period. In this case, for example, the correlation determination unit 133 may determine that there is no correlation when all the correlation coefficients in each period are equal to or smaller than a threshold value (for example, within ±0.2). Since the correlation coefficient is used to determine the presence or absence of a correlation between the used amount of the target component and the operating condition, the period for obtaining the correlation coefficient and the detection period are not necessarily the same. For example, for a component that is replaced within the detection period and for which the recorded values after the replacement are not sufficiently obtained, the correlation coefficient may be obtained based on the recorded values for a predetermined period retroactive from the date of replacement.

Here, it is assumed that there is no correlation between the used amount of the first-class component and the operating condition of the first-class device. In this case, it is considered that the possibility that the change in the life of the target component affects the operation of some first-class devices is relatively low. Therefore, when it is determined that there is no correlation for the first correlation (ACT104—NO), the life update unit 134 determines an update value of the life in order to update the life of the target component (ACT105).

Specifically, the life update unit 134 determines the update value of the life of the target component based on the current used amount of the target component in the first-class device. For example, the life update value can be a representative value of each used amount. As the representative value, any statistical representative value such as an average value, a median value, a maximum value, and a minimum value may be used. For example, the maximum value may be set as the representative value when the long-term operation of the component is prioritized, and the minimum value may be set as the representative value when the reduction of the risk due to the life update is prioritized.

On the other hand, it is assumed that there is a correlation between the used amount of the first-class component and the operating condition of the first-class device. In this case, it is considered that the possibility that the change in the life of the target component affects the operation of some first-class devices is relatively high. Therefore, when it is determined that there is a correlation for the first correlation (ACT104—YES), the life update unit 134 ends the life update process without updating the life of the target component.

With the component management device 1 according to the first embodiment configured as described above, it is possible to more safely update the life of the replaceable component of the multifunction peripheral 2. Specifically, since the component management device 1 determines the update value of the life based on the operation records of the plurality of multifunction peripherals 2, the life of each component can be updated to a more appropriate value. Further, since the component management device 1 updates the life when there is no correlation between the used amount of each component and the operating condition of the multifunction peripheral 2, the life can be updated while avoiding an excessive increase in operational risk. Further, with the component management device 1 according to the first embodiment, the lives of the plurality of multifunction peripherals 2 can be updated collectively, and thus, the life can be updated and managed more easily.

The life management by the component management device 1 according to the embodiment becomes more reliable as the operation record of the multifunction peripheral 2 as the basis is obtained in a more number of times. Therefore, it is preferable that the number of the multifunction peripherals 2 to be managed by the component management device 1 is large. Therefore, the component management device 1 may be configured to communicate with an unspecified number of multifunction peripherals 2 on the market via a public network such as the Internet. The multifunction peripheral 2 "on the market" here means the multifunction peripheral 2 that is being used by an end user. The component management device 1 configured as described above can acquire more operation information about the multifunction peripheral 2. In this way, the life of the replaceable component of the multifunction peripheral 2 can be continuously (for example, every month) updated to the latest value based on the operation records of many devices on the market.

The above effects mainly provide advantages in the management of the multifunction peripheral 2 connected to the network. However, the component management device 1 according to the embodiment can provide a great advantage even in managing the multifunction peripheral 2 not connected to the network.

For example, some users of the multifunction peripheral 2 refuse to connect the multifunction peripheral 2 to an external communication line due to security concerns. In this case, replacement of the components is performed only at the time of regular maintenance or at the time of visiting for other requirements. Therefore, the replacement of components in such a case is basically based on the set life.

Further, even if the information on the multifunction peripheral 2 can be acquired and the timing at which component replacement is required can be predicted, not all users necessarily replace components at that timing. For example, depending on the user, the priority may be given to reducing visit costs of maintenance staff and per-call maintenance costs.

Due to such circumstances, there are a certain number of components in the market that are continuously used without being replaced even when the used amount reaches the life.

However, even in such a case, the component management device 1 according to the embodiment continuously updates and holds the life of each component to an appropriate value based on the operation information of the other multifunction peripherals 2. Therefore, even in the case of the multifunction peripheral 2 not connected to the network, the maintenance staff can refer to the component management device 1 to update the life to an appropriate life, for example, during regular maintenance. As described above, with the component management device 1 according to the embodiment, it is possible to appropriately and easily set the lives of replaceable components for more multifunction peripherals 2. In addition, the maintenance timing of each multifunction peripheral 2 is thereby optimized, and the operation cost can be reduced in the entire market.

Second Embodiment

Figure 6:
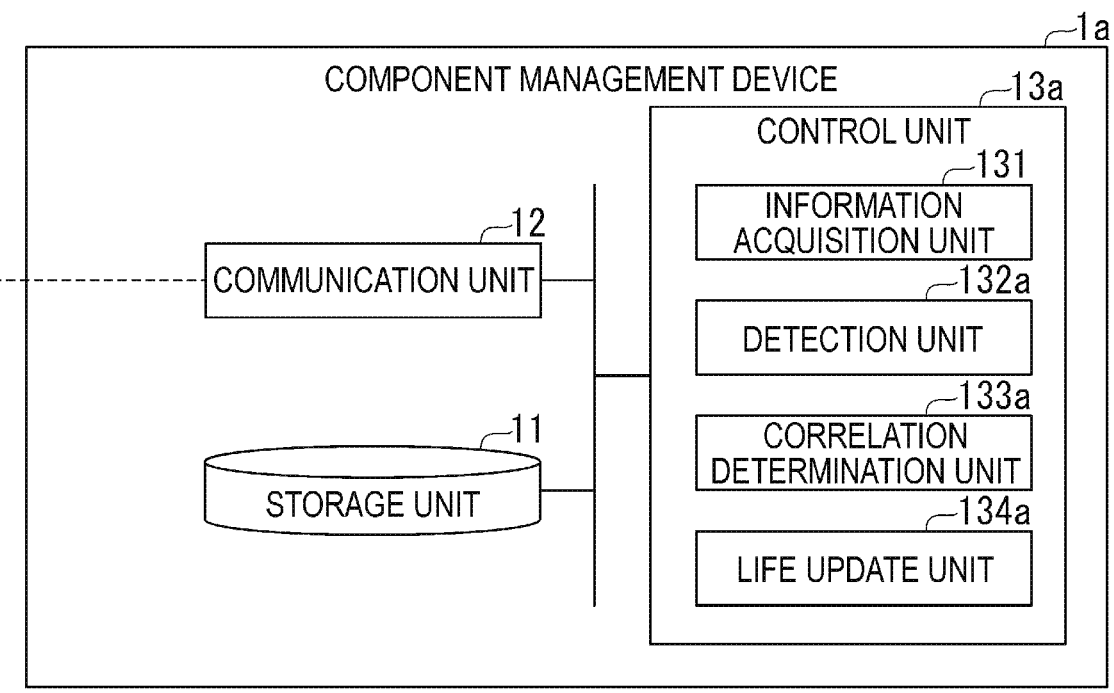
FIG. 6 is a diagram illustrating an example of a functional configuration of a component management device according to a second embodiment.

FIG. 6 is a diagram illustrating an example of a functional configuration of a component management device 1a according to a second embodiment. The component management device 1a is different from the component management device 1 according to the first embodiment in that a control unit 13a is provided instead of the control unit 13. The control unit 13a is different from the control unit 13 according to the first embodiment in that a detection unit 132a is provided instead of the detection unit 132. Further, the control unit 13a is different from the control unit 13 according to the first embodiment in that a correlation determination unit 133a is provided instead of the correlation determination unit 133. Further, the control unit 13a is different from the control unit 13 according to the first embodiment in that a life update unit 134a is provided instead of the life update unit 134. Other configurations are the same as those of the first embodiment. Therefore, in FIG. 6, the same configurations are denoted with the same reference numerals as in FIG. 4, and the descriptions thereof will be omitted. Here, for simplicity, the component management device 1a is illustrated as one device, but the component management device 1a may be configured by distributing individual components to a plurality of devices.

The detection unit 132a is different from the detection unit 132 according to the first embodiment in that with respect to the target component, the detection unit 132a also detects a second-class component and a second-class device in addition to detecting the first-class component and the first-class device. Here, the second-class component is a component that has a failure occurrence during the detection period among the components corresponding to the target component. The second-class device is the multifunction peripheral 2 including the second-class component.

The correlation determination unit 133a is different from the correlation determination unit 133 according to the first embodiment in that with respect to each target component, the correlation determination unit 133a determines the presence or absence of a second correlation in addition to the presence or absence of the first correlation. The second correlation is a correlation between the operating condition of the second-class device and the used amount of the target component of the second-class device. The presence or absence of the second correlation is determined in the same method as in the first correlation.

The life update unit 134a is different from the life update unit 134 according to the first embodiment in that the life update unit 134a updates the life of the target component based on the presence or absence of the second correlation in addition to the presence or absence of the first correlation.

FIG. 7 is a flowchart illustrating a specific example of a life update process executed by the component management device 1a according to the second embodiment. Similarly to FIG. 5, for simplicity, a case where a certain target component is detected will be described. In reality, a plurality of types of components can be detected as target components. In such a case, the following processes may be performed for each target component. Also, in FIG. 7, the same reference numerals are denoted to the same processes as in FIG. 5, the descriptions thereof will be omitted.

Also, ACT201 in FIG. 7 integrates the processes of detecting the first-class component and the first-class device (hereinafter, referred to as "first analysis process") into one. That is, ACT201 corresponds to ACT102 and ACT103 in FIG. 5.

On the other hand, the basic flow of the processes of detecting the second-class component and the second-class device (hereinafter referred to as "second analysis process") is the same as that of the first analysis process. Therefore, here, the second analysis process is described as ACT202 having the same process configuration as ACT201, and the detailed description thereof will be omitted.

First, in ACT202, the detection unit 132a detects the second-class component and the second-class device based on the operation information of each multifunction peripheral 2. For example, the detection unit 132a detects a component that satisfies the following conditions B1 to B3 as the second-class component among components corresponding to the target component detected by ACT101. Either of the conditions B2 and B3 may be selected.

[Condition B1] A failure related to itself occurs during the detection period.

In this case, components that have a replacement record and have a failure before or after the replacement also become detection targets.

[Condition B2] Among all the components satisfying the condition B1, the ratio of the component in which the failure occurs after the used amount has exceeded the life is equal to or more than a predetermined threshold value. Hereinafter, this threshold value is referred to as a second threshold value.

[Condition B3] Among all the components satisfying the condition B1, the ratio of the component in which the failure occurs before the used amount exceeds the life is equal to or less than a predetermined threshold value. Hereinafter, this threshold value is referred to as a third threshold value.

Subsequently, the correlation determination unit 133a obtains the first correlation, and the life update unit 134a determines the life update value based on the determination result of the first correlation (ACT104 and ACT105).

Hereinafter, the life update value determined here is referred to as a "first life update value".

Subsequently, the correlation determination unit 133a obtains the second correlation, and the life update unit 134a determines the life update value based on the determination result of the second correlation (ACT203 and ACT204). These processes are the same processes as ACT104 and ACT105. Hereinafter, the life update value determined here is referred to as a "second life update value".

Here, it is assumed that there is no correlation between the used amount of the second-class component and the operating condition of the second-class device. In this case, it is considered that the possibility that the change in the life affects the operation of some second-class devices is relatively low. Therefore, when it is determined that there is no correlation for the second correlation (ACT203—NO), the life update unit 134a determines a second life update value for the target component (ACT204). In this case, similarly to the first life update value, the life update unit 134a determines the second life update value based on the current used amount of the second-class component in the second-class device.

On the other hand, it is assumed that there is a correlation between the used amount of the second-class component and the operating condition of the second-class device. In this case, it is considered that the possibility that the change in the life affects the operation of some second-class devices is relatively high. Therefore, when it is determined that there is a correlation for the second correlation (ACT203—YES), the life update unit 134a ends the life update process without determining the second life update value.

Subsequently, the life update unit 134a determines a final life value to be applied to the target component (hereinafter, referred to as "applied life value") based on the first life update value and the second life update value (ACT205). For example, the life update unit 134a may adopt one of the first life update value and the second life update value as the applied life value. For example, when cost reduction is prioritized, the larger life update value may be adopted as the applied life value. Further, for example, when suppression of occurrence of a failure due to a change in life is prioritized, a smaller life update value may be adopted as the applied life value. Further, for example, the life update unit 134*a* may set a value obtained based on the first life update value and the second life update value as the applied life value.

With the component management device 1*a* according to the second embodiment configured as described above, it is possible to more appropriately update the life of replaceable components of a plurality of multifunction peripherals 2. Specifically, the component management device 1*a* updates the life based on the operation records of the component having a failure occurrence in addition to the operation records of the component having no failure occurrence. Therefore, it is possible to appropriately update the life of a component that has a low possibility of causing a failure.

More specifically, the component management device 1*a* can update the life of a component that has a record of a failure occurrence but has a high possibility that the used amount will exceed the life. In addition, the component management device 1*a* can update the life of a component that has a record of a failure occurrence but has a low possibility that the used amount will not exceed the life. With such a configuration, the component management device 1*a* according to the second embodiment can more appropriately update the life of the replaceable component of the multifunction peripheral 2.

Modification Example

Hereinafter, a modification example common to the first and second embodiments will be described.

The correlation determination unit 133 may determine whether or not there is a correlation (first correlation) between the used amount of the target component and the operating condition based on whether or not there is a correlation between the used amount and a plurality of operating conditions. For example, the correlation determination unit 133 may determine that there is no first correlation when no correlation with the used amount is found for each of the plurality of operating conditions (for example, temperature and humidity). In addition, when a correlation with the used amount is found only in a specific operating condition among the plurality of operating conditions, the life update unit 134 may determine the life update value based on the used amount that does not correspond to the operating condition. For example, a case where a correlation with the used amount is found only at a temperature of X° C. or higher can be considered. In this case, the life update unit 134 may extract the multifunction peripheral 2 operating at a temperature lower than X° C. among the first-class devices and may determine the life update value based on the current life of the extracted multifunction peripheral 2. This concept may be applied to the second correlation.

The detection unit 132 may detect the first-class component for the multifunction peripheral 2 of the same model as a target. For example, the model information of each multifunction peripheral 2 may be acquired as a part of the operation information, or may be registered in the component management device 1 in advance. In this case, the correlation determination unit 133 determines a correlation for a component having a closer operating condition. Further, in this case, the life update unit 134 determines the life update value based on the used amount of the component having a closer operating condition. Thereby, the component management device 1 can determine a more appropriate life. This concept may be applied to the second-class component.

The detection unit 132 may narrow down the first-class devices to be detected in accordance with the release time of the product. There are only a few models that have just been released on the market, and in many of those models, the used amount of the components does not reach the life. Therefore, by excluding such a multifunction peripheral 2 from the targets of the first-class device, the amount of calculation can be reduced and the reliability of the life update value can be increased. The components used in the multifunction peripheral 2 may be changed due to a minor model change or the like. In this case, there are multifunction peripherals 2 that use different components for the same model. Therefore, in this case, information such as a lot and a serial number may be used to detect the same model of multifunction peripheral 2 that uses the same component. This concept may be applied to the second-class device.

In addition, when detecting a component that has a record of operating beyond the life, the detection unit 132 may narrow down the components to be detected according to the length of the operating record. For example, instead of the condition that there is a record of operating beyond the life (even by one unit), a condition that there is a record of operating beyond the life by a certain value or more can be set. By doing so, the life can be updated under more appropriate conditions.

In addition, although three months has been described as an example of the detection period, the detection period may be adjusted according to a variation factor of the used amount. For example, when the use frequency and the operating environment of the multifunction peripheral 2 change according to the season, the detection period may be set to one year including all seasons.

The component management device 1 may store the initial value of the life for each component of each model in advance, or may acquire the initial value of the life from each multifunction peripheral 2 as a part of the operation information. Further, the component management device 1 may store the newly determined life and use the stored life for the subsequent update processes. Also, the target for which the component management device 1 manages the life is not limited to the multifunction peripheral 2 and any other device may be the target for the management of the life.

All or a part of each function of the component management device 1 or the multifunction peripheral 2 according to the embodiment may be realized using hardware such as an application specific integrated circuit (ASIC), a programmable logic device (PLD), and a field programmable gate array (FPGA). The program may be recorded on a computer-readable recording medium. The computer-readable recording medium is, for example, a portable medium such as a flexible disk, a magneto-optical disk, a ROM, and a CD-ROM, and a storage device such as a hard disk built in a computer system. The program may be transmitted via a telecommunication line.

According to at least one embodiment described above, the component management device according to the embodiment is a component management device that manages a threshold value related to the used amount of replaceable components, and includes a detection unit, a correlation determination unit, and an update unit. The detection unit detects a first-class component whose used amount exceeds the threshold value and which is used without causing a failure, based on component information related to the used amount and failure information related to the failure occurred with respect to the component in the device including the component, and detects a first-class device that is a device including the detected first-class component and not causing a failure related to the first-class component. The correlation determination unit determines the presence or absence of a correlation with respect to a first correlation that is a correlation between the used amount of the detected first-class component and an operating condition of the first-class device. When it is determined that there is no correlation for the first correlation, the update unit determines a first update value that is an update value of the threshold value based on the used amount of the first-class component in the first-class device. As a result, the component management device according to the embodiment can reduce the error between the life set for each component and the actual life, and can increase the reliability of the life of the component. In addition, since the component management device according to the embodiment manages an appropriate life, it is possible to share an appropriate life with the multifunction peripheral 2 that is not connected. Further, due to these synergistic effects, the maintenance cost of the multifunction peripheral 2 in the entire market can be reduced.

While some embodiments of the disclosure have been described, these embodiments have been presented by way of example only, and are not intended to limit the scope of the disclosure. These embodiments can be embodied in other various forms, and various omissions, substitutions, and changes can be made without departing from the gist of the disclosure. These embodiments and modifications thereof are included in the scope and gist of the disclosure, and are also included in the disclosure described in the claims and the equivalents thereof.

"Decoloring" in the present embodiment means to make an image formed with a color (including not only a chromatic color but also an achromatic color such as white and black) different from the background color of the paper visually invisible.

(In this embodiment, 'decoloring' means to make it difficult to recognize a color of an image formed on an image receiving member after the image is formed on the image receiving member by a recording material which has a different color from the color of the image receiving material. The color of recording material may be achromatic color including black or white, not limiting to chromatic color. And in the following embodiment, 'decoloring the image' means 'erasing the image'.)

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A component management device that manages a threshold value related to a used amount of replaceable components, comprising:

a detector configured to detect a first-class component whose used amount exceeds the threshold value and is used without causing a failure, based on component information related to the used amount and failure information related to a failure occurrence with respect to the first-class component in the component management device including the first-class component, and to detect a first-class device including the detected first-class component and not causing a failure related to the first-class component;

a processor that determines the presence or absence of a correlation with respect to a first correlation between the used amount of the detected first-class component and an operating condition of the first-class device; and the processor that determines a first update value of the threshold value based on the used amount of the first-class component in the first-class device when no correlation for the first correlation is determined, wherein the first-class component has the number of components whose used amount exceeds the threshold value and which is used without causing a failure exceeds a certain ratio of the total.

2. The component management device according to claim 1, wherein the detector detects the first-class component for the same type of component of the same model.

3. The component management device according to claim 1, wherein the detector detects a second-class component in which a number of components whose used amount exceeds the threshold value and which has a failure occurrence exceeding a certain ratio of the total, based on the component information and the failure information, and detects a second-class device including the detected second-class component and having a failure occurrence related to the second-class component, the processor determines the presence or absence of a correlation with respect to a second correlation between the used amount of the detected second-class component and an operating condition of the second-class device, and the processor determines a second update value of the threshold value based on the used amount of the second-class component in the second-class device when no correlation for the second correlation is determined, and determines a final update value of the threshold value based on the first update value and the second update value.

4. The component management device according to claim 3, wherein the second-class component has the number of components whose used amount exceeds the threshold value and which has a failure occurrence exceeding a certain ratio of the total.

5. The component management device according to claim 3, wherein the second-class component has the number of components whose used amount does not exceed the threshold value and which has a failure occurrence is equal to or less than a certain ratio of the total.

6. The component management device according to claim 3, wherein when the processor determines that there is a correlation only for a specific operating condition among a plurality of operating conditions with respect to the first correlation or the second correlation, and the processor determines the first update value or the second update value based on a used amount that does not correspond to the specific operating condition.

7. The component management device according to claim 1, further comprising:

the processor that acquires the component information and the failure information from a plurality of image forming apparatuses that communicate with the component management device, wherein the processor updates the threshold value related to the used amount of the replaceable component included in the plurality of image forming apparatuses with the determined update value.

8. A component management method for managing a threshold value related to a used amount of replaceable components, comprising:

detecting, by a detector, a first-class component whose used amount exceeds the threshold value and which is used without causing a failure, based on component information related to the used amount and failure information related to a failure occurrence with respect to the first-class component in a component management device including the first-class component, and detecting a first-class device including the detected first-class component and not causing a failure related to the first-class component;

determining, by a processor, the presence or absence of a correlation with respect to a first correlation between the used amount of the detected first-class component and an operating condition of the first-class device; and determining, by the processor, a first update value of the threshold value based on the used amount of the first-class component in the first-class device when no correlation for the first correlation is determined;

wherein the first-class component has the number of components whose used amount exceeds the threshold value and which is used without causing a failure exceeds a certain ratio of the total.

9. The component management method according to claim 8, further comprising:

detecting, by the detector, the first-class component for the same type of component of the same model.

10. The component management method according to claim 8, further comprising:

detecting, by the detector, a second-class component in which a number of components whose used amount exceeds the threshold value and which has a failure occurrence exceeding a certain ratio of the total, based on the component information and the failure information, and detecting a second-class device including the detected second-class component and having a failure occurrence related to the second-class component;

determining, by the processor, the presence or absence of a correlation with respect to a second correlation between the used amount of the detected second-class component and an operating condition of the second-class device, and determining, by the processor, a second update value of the threshold value based on the used amount of the second-class component in the second-class device when no correlation for the second correlation is determined, and determining a final update value of the threshold value based on the first update value and the second update value.

11. The component management method according to claim 10, wherein the second-class component has the number of components whose used amount exceeds the threshold value and which has a failure occurrence exceeding a certain ratio of the total.

12. The component management method according to claim 10, wherein the second-class component has the number of components whose used amount does not exceed the threshold value and which has a failure occurrence is equal to or less than a certain ratio of the total.

13. The component management method according to claim 10, further comprising:

determining, by the processor, that there is a correlation only for a specific operating condition among a plurality of operating conditions with respect to the first correlation or the second correlation, and determining, by the processor, the first update value or the second update value based on a used amount that does not correspond to the specific operating condition.

14. The component management method according to claim 8, further comprising:

acquiring, by the processor, the component information and the failure information from a plurality of image forming apparatuses that communicate with the component management device, and updating, by the processor, the threshold value related to the used amount of the replaceable component included in the plurality of image forming apparatuses with the determined update value.

15. A non-transitory storage medium that stores a computer program for operating a computer as a component management device that manages a threshold value related to a used amount of replaceable components, comprising:

a detection component configured to detect a first-class component whose used amount exceeds the threshold value and which is used without causing a failure, based on component information related to the used amount and failure information related to a failure occurrence with respect to the first-class component in the component management device including the first-class component, and to detect a first-class device including the detected first-class component and not causing a failure related to the first-class component;

a correlation determination component configured to determine the presence or absence of a correlation with respect to a first correlation between the used amount of the detected first-class component and an operating condition of the first-class device; and an update component configured to determine a first update value of the threshold value based on the used amount of the first-class component in the first-class device when no correlation for the first correlation is determined;

wherein the second-class component has the number of components whose used amount exceeds the threshold value and which has a failure occurrence exceeding a certain ratio of the total.

16. The non-transitory storage medium according to claim 15, wherein the detection component detects the first-class component for the same type of component of the same model.

17. The non-transitory storage medium according to claim 15, wherein the detection component detects a second-class component in which a number of components whose used amount exceeds the threshold value and which has a failure occurrence exceeding a certain ratio of the total, based on the component information and the failure information, and detects a second-class device including the detected second-class component and having a failure occurrence related to the second-class component, the correlation determination component determines the presence or absence of a correlation with respect to a second correlation between the used amount of the detected second-class component and an operating condition of the second-class device, and the update component determines a second update value of the threshold value based on the used amount of the second-class component in the second-class device when no correlation for the second correlation is determined, and determines a final update value of the threshold value based on the first update value and the second update value.

\* \* \* \* \*